(12) United States Patent
Wu et al.

(10) Patent No.: US 12,277,674 B2
(45) Date of Patent: Apr. 15, 2025

(54) SEMANTICS-BASED HIGH RESOLUTION RECONSTRUCTION METHOD OF NIGHTTIME LIGHT REMOTE SENSING IMAGE

(71) Applicant: Wuhan University, Wuhan (CN)

(72) Inventors: Zhaocong Wu, Wuhan (CN); Weixing Xu, Wuhan (CN); Zhao Yan, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 152 days.

(21) Appl. No.: 18/204,366

(22) Filed: May 31, 2023

(65) Prior Publication Data

US 2023/0410257 A1 Dec. 21, 2023

(30) Foreign Application Priority Data

Jun. 16, 2022 (CN) .......................... 202210680499.X

(51) Int. Cl.

| | |
|---|---|
| *G06T 3/4076* | (2024.01) |
| *G06F 18/214* | (2023.01) |
| *G06T 3/4038* | (2024.01) |
| *G06T 3/4046* | (2024.01) |
| *G06T 3/4053* | (2024.01) |

(Continued)

(52) U.S. Cl.
CPC ............. *G06T 3/4076* (2013.01); *G06T 5/70* (2024.01); *G06V 10/20* (2022.01); *G06T 2207/10032* (2013.01); *G06T 2207/20132* (2013.01); *G06T 2207/30181* (2013.01)

(58) Field of Classification Search
CPC ...................... G06T 3/4076; G06T 5/70; G06T 2207/10032; G06T 2207/20132; G06T 2207/30181; G06T 3/4046; G06T 3/4053; G06T 7/33; G06T 3/4038; G06T 7/11; G06T 2200/32; G06V 10/20; G06V 20/13;

(Continued)

(56) References Cited

U.S. PATENT DOCUMENTS

2020/0394791 A1\* 12/2020 Pang ....................... G06N 3/045
2022/0020197 A1\* 1/2022 Kuta ....................... G06T 13/80

OTHER PUBLICATIONS

Yang Ye et al., A feasible framework to downscale NPP-VIIRS nighttime light imagery using multi-source spatial variables and geographically weighted regression, Aug. 26, 2021, International Journal of Applied Earth Observation and Geoinformation, vol. 104 (Year: 2021).\*

\* cited by examiner

*Primary Examiner* — Amandeep Saini
*Assistant Examiner* — Andrew S Budisalich
(74) *Attorney, Agent, or Firm* — JCIP GLOBAL INC.

(57) ABSTRACT

A semantics-based high resolution reconstruction method of a nighttime light remote sensing image includes: constructing a sample data set; the sample data set includes a plurality of data groups, and each data group includes a LR NTL image, and a HR NTL image and light semantics information consistent in spatial position with the LR NTL image; constructing a reconstruction model; performing training and validation on the reconstruction model by using the sample data set to obtain an optimized reconstruction model; and taking a to-be-reconstructed LR NTL image and light semantic information corresponding to the to-be-reconstructed LR NTL image as an input of the optimized reconstruction model, and outputting, by the optimized reconstructed model, a HR NTL image obtained through resolution reconstruction.

6 Claims, 3 Drawing Sheets

(51) Int. Cl.
*G06T 5/70* (2024.01)
*G06T 7/11* (2017.01)
*G06T 7/33* (2017.01)
*G06V 10/20* (2022.01)
*G06V 10/774* (2022.01)
*G06V 10/776* (2022.01)
*G06V 10/82* (2022.01)
*G06V 20/13* (2022.01)

(58) Field of Classification Search
CPC .... G06V 10/774; G06V 10/776; G06V 10/82;
Y02A 90/10; G06F 18/214
See application file for complete search history.

SEMANTICS-BASED HIGH RESOLUTION RECONSTRUCTION METHOD OF NIGHTTIME LIGHT REMOTE SENSING IMAGE

CROSS-REFERENCE TO RELATED APPLICATIONS

Pursuant to 35 U.S.C. § 119 and the Paris Convention Treaty, this application claims foreign priority to Chinese Patent Application No. 202210680499.X filed Jun. 16, 2022, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of processing technologies of the nighttime light remote sensing images and in particular to a semantics-based high resolution reconstruction method of a nighttime light remote sensing image.

Nighttime light remote sensing (NTL remote sensing), as an important actively-developing branch, has drawn more and more attention from the fields of natural science and social economy in recent years. The earth surface light intensity information recorded by nighttime light remote sensing data obtained by nighttime light remote sensing can more directly reflects the differences of human activities, and hence can be widely applied to the fields such as population estimate, urbanization process research, spatialization estimate of social economic index, significant event evaluation, ecological environmental evaluation, urban development and its spatial structure analysis and the like.

At present, there are two usual types of open-source nighttime light data observed in a long period on a global scale. One type of data is digital image data with global coverage, daily re-visit frequency and spatial resolution of 3 km provided by National Aeronautics and Space Administration (NASA) and National Oceanic and Atmospheric Administration's National Geophysical Data Center through Defense Meteorological Satellite Program's Operational Line-Scan System. The other type of data is NPP VIIRS nighttime light data with global coverage, one global imaging per day and spatial resolution of 500 m provided by the Visible Infrared Imaging Radiometer Suite (VIIRS) carried by the satellite of Suomi National Polar-Orbiting Partnership (NPP) and released at the beginning of 2013 by National Oceanic and Atmospheric Administration's National Geophysical Data Center (NOAA/NGDC). The above two types of nighttime light data both are characterized by high time resolution, rich historical data accumulation and low spatial resolution. The insufficient spatial resolution limits further refined applications of the nighttime data in the fields of long-time historical data analysis and refined modeling and the like. Therefore, it is impossible to satisfy the existing relevant application requirements.

SUMMARY

The disclosure provides a semantics-based reconstruction method of a nighttime light remote sensing image so as to solve the problem of low spatial resolution of nighttime light data in the related art.

The semantics-based high resolution reconstruction method of a nighttime light remote sensing image comprises the following steps:
1) constructing a sample data set; the sample data set comprises a plurality of data groups, and each data group comprises an NTL remote sensing image with low-spatial-resolution (Hereafter all referred to as LR NTL image), and an NTL remote sensing image with high-spatial-resolution (Hereafter all referred to as HR NTL image) and light semantics information consistent in spatial position with the LR NTL image.
2) constructing a reconstruction model;
3) performing training and validation on the reconstruction model by using the sample data set to obtain an optimized reconstruction model; and
4) taking a to-be-reconstructed LR NTL image and light semantic information corresponding to the to-be-reconstructed LR NTL image as an input of the optimized reconstruction model, and outputting, by the optimized reconstructed model, a HR NTL image obtained through resolution reconstruction.

In a class of this embodiment, the light semantics information comprises impervious surface data and road network data.

In a class of this embodiment, 1) comprises the following sub-steps:
  obtaining an initial sample data set; the initial sample data set comprises a LR NTL image, a HR NTL image and light semantics information;
  performing pre-processing on the initial sample data set; and
  performing spatial registration on the pre-processed data.

In a class of this embodiment, performing pre-processing on the initial sample data set comprises:
  performing pre-processing of background noise removable and resampling on the LR NTL image;
  performing pre-processing of abnormal value removal and background noise removal on the HR NTL image;
  performing pre-processing of splicing, cropping and resampling on the impervious surface data; and
  performing pre-processing of cropping, screening and vector-to-raster conversion on the road network data.

In a class of this embodiment, after spatial registration is performed on the data, the method further comprises: performing selection on the spatially-registered data groups to obtain light-dense samples, light-sparse samples, and light-free samples at a ratio of 7:2:1 to form the sample data set;
  samples in which a ratio of a light-covered region to a total image region is greater than or equal to ⅓ are defined as the light-dense samples, and samples in which a ratio of a light-covered region to a total image region is less than ⅓ are defined as the light-sparse samples, and samples without light coverage are defined as the light-free samples.

Preferably, in 2), a network architecture model of the reconstruction model adopts Unet.

Preferably, in 3), when the reconstruction model is trained, the LR NTL image and the light semantics information consistent in spatial position with the LR NTL image are input to the reconstruction model which outputs a reconstructed HR NTL image; the reconstructed HR NTL image is compared with the HR NTL image consistent in spatial position with the LR NTL image in the sample data set to measure an error therebetween by using a loss function, and when the loss function is minimum the reconstruction model reaches the optimum and model parameters are stored, so as to obtain the optimized reconstruction model.

In a class of this embodiment, the loss function is expressed as:

$$L(\hat{I}, I) = \frac{1}{N}\sum_{i=1}^{N}\sum_{s=1}^{S}L_1(\hat{I}(x_N, x_R, x_I)_{i,s}, I_{i,s}) + \lambda L_{TV}(\hat{I}(x_N, x_R, x_I)_{i,s})$$

in the formula:

$$L_1(\hat{I}, I) = \frac{1}{hwc}\sum_{i,j,k}\sqrt{(\hat{I}_{i,j,k} - I_{i,j,k})^2 + \varepsilon^2}$$

$$L_{TV}(\hat{I}) = \frac{1}{hwc}\sum_{i,j,k}\sqrt{(\hat{I}_{i,j+1,k} - \hat{I}_{i,j,k})^2 + (\hat{I}_{i+1,j,k} - \hat{I}_{i,j,k})^2}$$

where L ($\hat{I}$,I) is a loss function of the reconstructed HR NTL image $\hat{I}$ and the to-be-compared HR NTL image I in the sample data set, $\hat{I}$ refers to the reconstructed HR NTL image, I refers to the to-be-compared HR NTL image in the sample data set; N refers to a number of samples in the sample data set; S refers to a number of scale layers of multi-scale loss, $L_1$ refers to L1 loss, $x_N$ refers to the LR NTL image, $x_R$ refers to the road network data, $x_I$ refers to the impervious surface data; $\hat{I}(x_N, x_R, x_I)_{i,s}$ refers to a reconstructed HR NTL image obtained by inputting the LR NTL image data $x_N$, the road network data $x_R$, and the impervious surface data $x_I$ on an s-th scale layer for an i-th sample; $I_{i,s}$ refers to the to-be-compared HR NTL image in the sample data set on an s-th scale layer for an i-th sample; and $L_{TV}$ refers to a TV regularization loss, and $\lambda$ refers to a weight hyperparameter of the TV regularization loss; $L_1(\hat{I},I)$ refers to L1 loss of the reconstructed HR NTL image $\hat{I}$ and the to-be-compared HR NTL image $\hat{I}$ in the sample data set, h refers to a row number of the reconstructed HR NTL image $\hat{I}$, w refers to a column number of the reconstructed HR NTL image $\hat{I}$, c refers to a channel number of the reconstructed HR NTL image $\hat{I}$, $\hat{I}_{i,j,k}$ refers to a reconstruction result of the HR NTL image of the i-th row and j-th column of a k-th channel, $I_{i,j,k}$ refers to the to-be-compared HR NTL image of the i-th row and j-th column of a k-th channel in the sample data set, $\varepsilon$ refers to $1e^{-3}$; $L_{TV}(\hat{I})$ refers to a TV regularization loss corresponding to the reconstructed HR NTL image $\hat{I}$, $\hat{I}_{i,j+1,k}$ refers to a reconstruction result of the HR NTL image of an i-th row and a (j+1)-th column of a k-th channel, and $\hat{I}_{i+1,j,k}$ refers to a reconstruction result of the HR NTL image of a (i+1)-th row and a j-th column of a k-th channel.

One or more technical solutions of the disclosure at least have the following technical effects or advantages.

In the disclosure, for a LR NTL image, it is firstly proposed to perform resolution reconstruction in combination with light semantics information to a HR NTL image, which provides a brand-new data source for obtaining historical HR NTL image data, helping application of the nighttime light data in the refined modeling and analysis and the like. The light semantics information in the disclosure comprises impervious surface data and road network data. The road network data is used to provide constraint information of road-reflected light and the impervious surface data is used to provide constraint information of radiating light of artificial building regions. In this way, high resolution reconstruction can be achieved for nighttime light data such that the reconstruction result has richer and more accurate light radiation intensity and light spatial distribution details, so as to obtain a HR NTL image capable of satisfying existing relevant application requirements of refined modeling and analysis etc.

BRIEF DESCRIPTIONS OF THE DRAWINGS

FIG. 2A is a LR NTL image before reconstruction; and FIG. 2B is a HR NTL image after reconstruction.

DETAILED DESCRIPTIONS OF EMBODIMENTS

Researches show that the nighttime light radiations of different semantics have noticeable source difference and the nighttime light radiations of different semantics may be described by using corresponding data. Firstly, the nighttime light observed by a satellite mainly comes from roads which are mainly characterized by line shape and wide distribution scope. The road light mainly comes from earth surface reflection contribution with the largest contribution of nighttime light radiation. The road light radiations are described by using high-resolution road network data. Secondly, the light radiations come from artificial building regions such as commercial districts, sea ports, wharfs, airports and residential districts and the like. This part of light mainly takes the form of sky direct radiation and scatter. The commercial districts, sea ports, wharfs, airports have strong light radiation intensity but small radiation area, whereas the residential districts have large light radiation area but weak light radiation intensity. Therefore, the artificial building regions such as commercial districts, sea ports, wharfs, airports and residential districts provide another small part of light radiations. The light radiations of the artificial building regions are described by using high-resolution impervious surface.

In the disclosure, based on the above theory, from the perspective of the semantics of the nighttime light radiation, a semantics-based high resolution reconstruction method of a nighttime light remote sensing image is proposed. In this method, light semantics information is fused to take the light semantics information as constraint information in a reconstruction process so as to obtain a HR NTL image. Specifically, in the disclosure, the high-resolution road network data is used to provide constraint information of road-reflected light and the high-resolution impervious surface data is used to provide constraint information of radiating light of artificial building regions, thereby achieving high resolution reconstruction for the nighttime light data.

In order to help better understand the above technical solution, the technical solution will be set forth in details in combination with accompanying drawings and specific embodiments.

Figure 1:
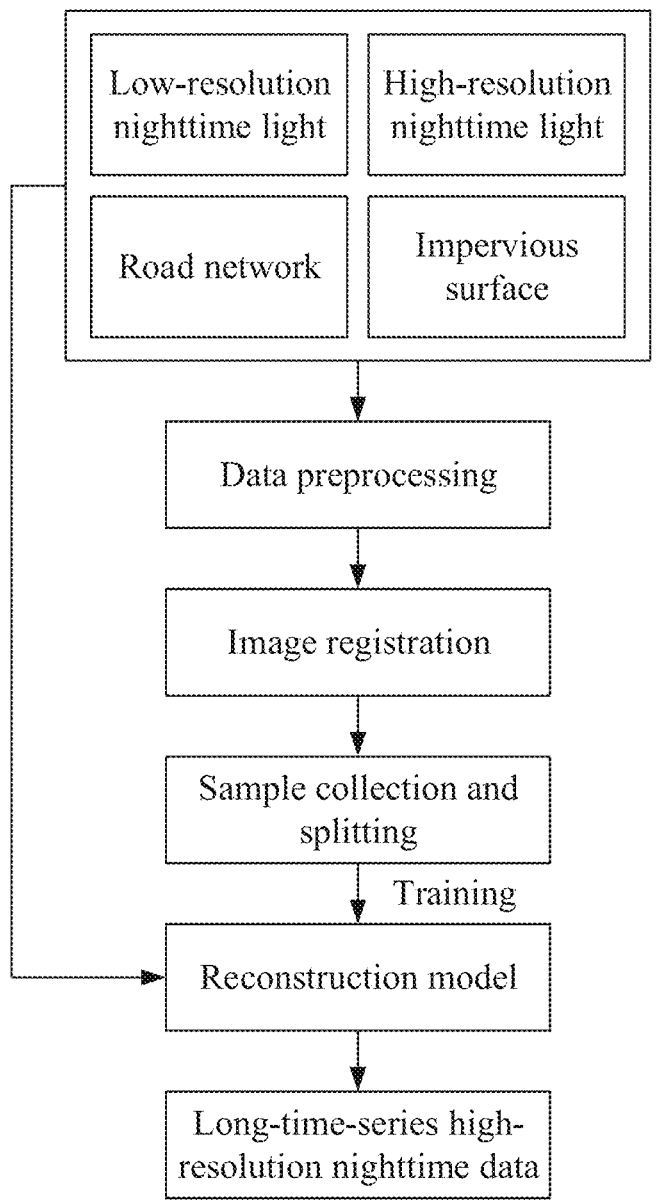
FIG. 1 is a flowchart illustrating a semantics-based high resolution reconstruction method of a nighttime light remote sensing image according to an embodiment of the disclosure.

An embodiment of the disclosure provides a semantics-based high resolution reconstruction method of a nighttime light remote sensing image. As shown in FIG. 1, the method comprises the following steps.

At step 1, a sample data set is constructed; the sample data set comprises a plurality of data groups, and each data group comprises a LR NTL image, and a HR NTL image and light semantics information consistent in spatial position with the LR NTL image.

The light semantics information comprises impervious surface data and road network data.

Specifically, the step 1 comprises the following sub-steps:
(1.1) an initial sample data set is obtained, where the initial sample data set comprises a LR NTL image, a HR NTL image and light semantics information;
(1.2) pre-processing is performed on the initial sample data set.

Pre-processing of background noise removable and resampling is performed on the LR NTL image; pre-processing of abnormal value removal and background noise removal is performed on the HR NTL image; pre-processing of splicing, cropping and resampling is performed on the impervious surface data; pre-processing of cropping, screening and vector-to-raster conversion is performed on the road network data.

(1.3) Spatial registration is performed on the pre-processed data.

Spatial registration is performed on the LR NTL image, HR NTL image, the impervious surface data and the road network data to keep the spatial positions of the multiple-source data consistent.

In a preferred solution, after spatial registration is performed on the data, the method further comprises the followings.

(1.4) Sample collection and split

Selection is performed on the spatially-registered data groups to obtain light-dense samples, light-sparse samples, and light-free samples at a ratio of 7:2:1 to form the sample data set. Samples in which a ratio of a light-covered region to a total image region is greater than or equal to ⅓ are defined as the light-dense samples, and samples in which a ratio of a light-covered region to a total image region is less than ⅓ are defined as the light-sparse samples, and samples without light coverage are defined as the light-free samples.

With the above sample ratio, consideration can be made to the difference of urban and suburb light distributions. Further, with addition of the light-free samples, robustness of the model training can be improved.

The sample size preferably is 128*128 pixels. With this size, sample texture information can be effectively used and deep semantics information of the sample data can be dug at the same time.

At step 2, a reconstruction model is constructed.

A network architecture model of the reconstruction model adopts Unet.

At step 3, training and validation are performed on the reconstruction model by using the sample data set to obtain an optimized reconstruction model.

When the reconstruction model is trained, the LR NTL image and the light semantics information consistent in spatial position with the LR NTL image are input to the reconstruction model which outputs a reconstructed HR NTL image; the reconstructed HR NTL image is compared with the HR NTL image consistent in spatial position with the LR NTL image in the sample data set to measure an error there between by using a loss function, and when the loss function is minimum, the reconstruction model reaches the optimum and model parameters are stored, so as to obtain the optimized reconstruction model.

The loss function frequently used in an existing reconstruction algorithm is L1 loss, which may lead to over-smoothness of the reconstructed image, hence leading to detail loss. In the disclosure, addition of a total variation (TV) regularization loss and a multi-scale loss to L1 can improve the details of the reconstructed image so as to obtain a better reconstruction effect.

The loss function may be expressed as:

$$L\left(\hat{I}, I\right) = \frac{1}{N}\sum_{i=1}^{N}\sum_{s=1}^{S} L_1\left(\hat{I}(x_N, x_R, x_I)_{i,s}, I_{i,s}\right) + \lambda L_{TV}\left(\hat{I}(x_N, x_R, x_I)_{i,s}\right)$$

in the formula:

$$L_1\left(\hat{I}(x_N, x_R, x_I)_{i,s}, I_{i,s}\right) = L_1(\hat{I}, I) = \frac{1}{hwc}\sum_{i,j,k}\sqrt{\left(\hat{I}_{i,j,k} - I_{i,j,k}\right)^2 + \varepsilon^2}$$

$$L_{TV}\left(\hat{I}(x_N, x_R, x_I)_{i,s}, I_{i,s}\right) =$$

$$L_{TV}(\hat{I}) = \frac{1}{hwc}\sum_{i,j,k}\sqrt{\left(\hat{I}_{i,j+1,k} - \hat{I}_{i,j,k}\right)^2 + \left(\hat{I}_{i+1,j,k} - \hat{I}_{i,j,k}\right)^2}$$

where $L(\hat{I}, I)$ is a loss function of the reconstructed HR NTL image $\hat{I}$ and the to-be-compared HR NTL image I in the sample data set, $\hat{I}$ refers to the reconstructed HR NTL image, I refers to the to-be-compared HR NTL image in the sample data set; N refers to a number of samples in the sample data set; S refers to a number of scale layers of multi-scale loss, $L_i$ refers to L1 loss, $x_N$ refers to the LR NTL image data, $x_R$ refers to the road network data, $x_I$ refers to the impervious surface data; $\hat{I}(x_N, x_R, x_I)_{i,s}$ refers to a reconstructed HR NTL image obtained by inputting the LR NTL image data $x_N$, the road network data $x_R$, and the impervious surface data $x_I$ on an s-th scale layer for an i-th sample; $I_{i,s}$ refers to the to-be-compared HR NTL image in the sample data set on an s-th scale layer for an i-th sample; and $L_{TV}$ refers to a TV regularization loss, and $\lambda$ refers to a weight hyperparameter of the TV regularization loss. $L_1(\hat{I},I)$ refers to L1 loss of the reconstructed HR NTL image $\hat{I}$ and the to-be-compared HR NTL image I in the sample data set, h refers to a row number of the reconstructed HR NTL image $\hat{I}$, w refers to a column number of the reconstructed HR NTL image $\hat{I}$, c refers to a channel number of the reconstructed HR NTL image $\hat{I}$, $\hat{I}_{i,j,k}$ refers to a reconstruction result of the HR NTL image of the i-th row and j-th column of a k-th channel, $I_{i,j,k}$ refers to the to-be-compared HR NTL image of the i-th row and j-th column of a k-th channel in the sample data set, $\varepsilon$ refers to $1e^{-3}$; $L_{TV}(\hat{I})$ refers to a TV regularization loss corresponding to the reconstructed HR NTL image $\hat{I}$, $\hat{I}_{i,j+1,k}$ refers to a reconstruction result of the HR NTL image of an i-th row and a (j+1)-th column of a k-th channel, and $\hat{I}_{i+1,j,k}$ refers to a reconstruction result of the HR NTL image of a (i+1)-th row and a j-th column of a k-th channel.

At step 4, a to-be-reconstructed LR NTL image and light semantics information corresponding to the to-be-reconstructed LR NTL image are taken as an input of the optimized reconstruction model, and the optimized reconstruction model outputs a HR NTL image obtained through resolution reconstruction.

Specifically, historical multi-period LR NTL image, road network data and impervious surface data are input into the trained reconstruction model to obtain a reconstructed HR NTL image.

The implementation steps of the disclosure will be described with the following data.

At step 1, NPP VIIRS low-resolution nighttime light data (https://ladsweb.modaps.eosdis.nasa.gov/search/) and high-resolution impervious surface data (http://data.ess.tsinghua.edu.cn/gaia.html), and high-resolution road network data (https://www.openstreetmap.org/) from 2012 to 2021 for China region are obtained; further, Luojia No. 1 high resolution nighttime light data (http://59.175.109.173:8888/) with cloud amount less than 10% for 2018 is obtained.

At step 2, the Luojia No. 1 data, the NPP VIIRS data, the impervious surface data and the road network data are pre-processed.

Specifically, pre-processing of background noise removal and resampling is performed on the NPP VIIRS data; pre-processing of splicing, cropping and resampling is performed on the impervious surface data; pre-processing of cropping, screening and vector-to-raster conversion is performed on the road network data; pre-processing of abnormal value removal and background noise removal is performed on the Luojia No. 1 data. Further, in order to keep spatial positions consistent, spatial registration is performed on the four types of data.

At step 3, by using the registered 2018 Luojia No. 1 data, 2018 NPP VIIRS data, and corresponding impervious surface data and road network data, samples are collected to form a data set, where the sample size is 128*128 pixels.

At step 4, a reconstruction model is trained using the data set.

In the disclosure, while the multi-source data representing the light semantics information is introduced as additional constraint into the model, a multi-scale structure is disposed to improve the training accuracy and efficiency.

The network architecture model of the reconstruction model adopts U-net network so as to establish a Pytorch framework.

L1 norm loss function is used to optimize the model to produce a blur effect. Thus, in the disclosure, addition of the regularization item and the multi-scale loss fused with the multi-source data to the L1 norm loss constrains the model so as to improve the quality of the reconstruction result of the nighttime light data. The loss function added with the regularization constraint and the multi-scale loss is as follows:

$$L\left(\hat{I}, I\right) = \frac{1}{N}\sum_{i=1}^{N}\sum_{s=1}^{S} L_1\left(\hat{I}(x_N, x_R, x_I)_{i,s}, I_{i,s}\right) + \lambda L_{TV}\left(\hat{I}(x_N, x_R, x_I)_{i,s}\right)$$

At step 5, the historical period NPP VIIRS nighttime light data (e.g. NPP VIIRS low resolution nighttime light data of 2012 to 2021 for China region), and corresponding impervious surface data and road network data are input into the trained reconstruction model to obtain a high spatial resolution result of a historical long-period NPP VIIRS nighttime light.

Figure 2A:
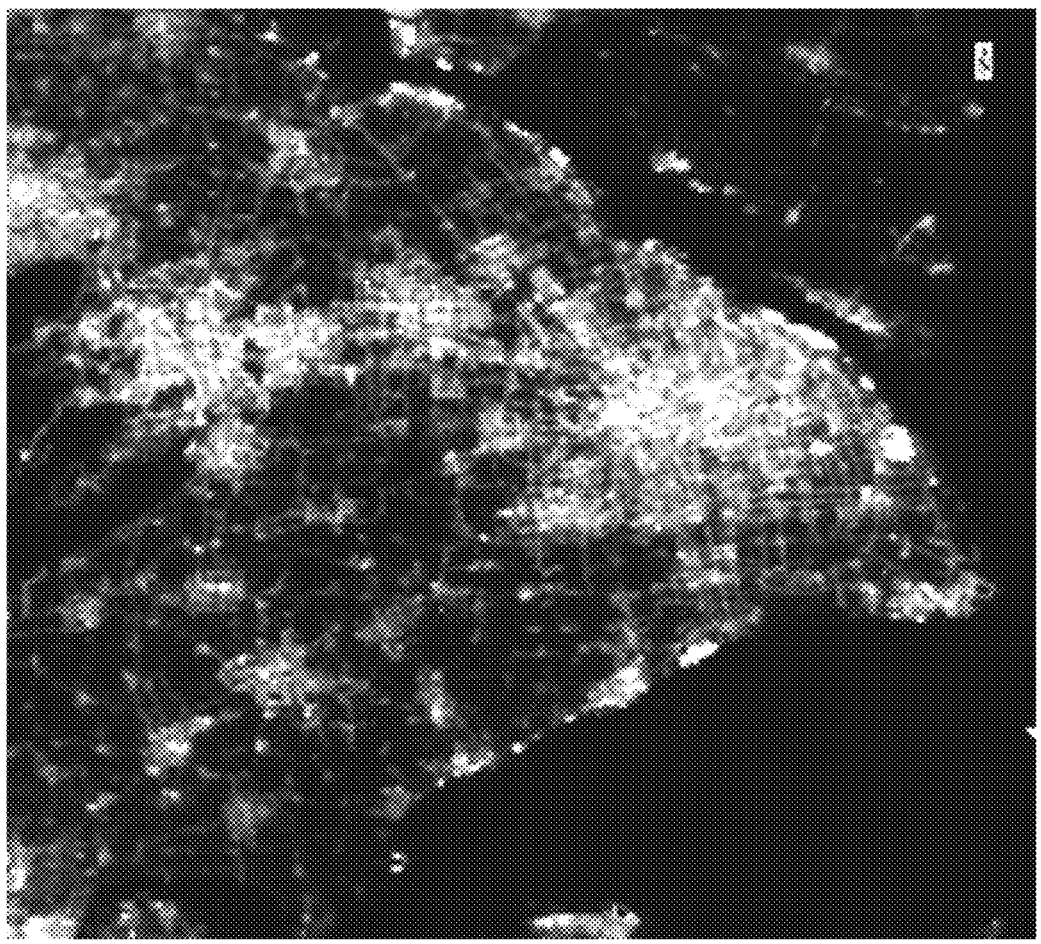
FIGS. 2A-2B are comparison diagrams of a nighttime light remote sensing image before and after reconstruction, where
Figure 2B:

FIGS. 2A-2B are comparison diagrams of the nighttime light remote sensing image before and after reconstruction, where FIG. 2A refers to a LR NTL image before reconstruction, and FIG. 2B refers to a HR NTL image after reconstruction. It is apparent that the reconstruction effect of the disclosure is better, and the reconstructed HR NTL image has very rich and accurate light radiation intensity and light spatial distribution details.

Finally, it is to be noted that the above specific embodiments are used to only to describe the technical solution of the disclosure rather than limit the technical solution of the disclosure. Although detailed descriptions are made to the disclosure by referring to instances, those skilled in the art should understand that modifications or equivalent substitutions made to the technical solution of the disclosure without departing from the spirit and scope of the technical solution of the disclosure shall fall within the scope claimed by the appended claims.

What is claimed is:

1. A semantics-based high resolution reconstruction method of a nighttime light (NTL) remote sensing image, the method comprising:
   1) constructing a sample data set; wherein the sample data set comprises a plurality of data groups, and each data group comprises an NTL remote sensing image with low-spatial-resolution (LR NTL image), and an NTL remote sensing image with high-spatial-resolution (HR NTL image) and light semantics information consistent in spatial position with the LR NTL image;
   2) constructing a reconstruction model, wherein a network architecture model of the reconstruction model adopts U-Net;
   3) performing training and validation on the reconstruction model by using the sample data set to obtain an optimized reconstruction model;
   when the reconstruction model is trained, inputting the LR NTL image and the light semantics information consistent in the spatial position with the LR NTL image to the reconstruction model which outputs a reconstructed HR NTL image; comparing the reconstructed HR NTL image with the HR NTL image consistent in the spatial position with the LR NTL image in the sample data set to measure an error therebetween by using a loss function, and an optimal U-Net reconstruction model is obtained when the loss function is minimized; and
   4) taking a to-be-reconstructed LR NTL image and light semantics information corresponding to the to-be-reconstructed LR NTL image as an input of the optimized reconstruction model, and outputting, by the optimized U-Net reconstruction model in 3), a HR NTL image obtained through resolution reconstruction.

2. The method of claim 1, wherein the light semantics information comprises impervious surface data and road network data.

3. The method of claim 2, wherein 1) comprises the following sub-steps:
   obtaining an initial sample data set, wherein the initial sample data set comprises the LR NTL image as target data for reconstruction, the HR NTL image as labels in U-Net reconstruction model training and the light semantics information as auxiliary data for reconstruction;
   performing pre-processing on the initial sample data set; and
   performing spatial registration on the pre-processed data.

4. The method of claim 3, wherein performing pre-processing on the initial sample data set comprises:
   performing pre-processing of background noise removable and resampling on the LR NTL image;
   performing pre-processing of abnormal value removal and background noise removal on the HR NTL image;
   performing pre-processing of splicing, cropping and resampling on the impervious surface data; and
   performing pre-processing of cropping, screening and vector-to-raster conversion on the road network data.

5. The method of claim 3, wherein after spatial registration is performed on the pre-processed data, the method further comprises: performing selection on the spatially-registered data groups to obtain light-dense samples, light-sparse samples, and light-free samples at a ratio of 7:2:1 to form the sample data set; and samples in which a ratio of a light-covered region to a total image region is greater than or equal to ⅓ are defined as the light-dense samples, and samples in which a ratio of a light-covered region to a total image region is less than ⅓ are defined as the light-sparse samples, and samples without light coverage are defined as the light-free samples.

6. The method of claim 1, wherein the loss function is expressed as:

$$L(\hat{I}, I) = \frac{1}{N}\sum_{i=1}^{N}\sum_{s=1}^{S} L_1(\hat{I}(x_N, x_R, x_I)_{i,s}, I_{i,s}) + \lambda L_{TV}(\hat{I}(x_N, x_R, x_I)_{i,s})$$

in the formula:

$$L_1(\hat{I}, I) = \frac{1}{hwc}\sum_{i,j,k}\sqrt{(\hat{I}_{i,j,k} - I_{i,j,k})^2 + \varepsilon^2}$$

$$L_{TV}(\hat{I}) = \frac{1}{hwc}\sum_{i,j,k}\sqrt{(\hat{I}_{i,j+1,k} - \hat{I}_{i,j,k})^2 + (\hat{I}_{i+1,j,k} - \hat{I}_{i,j,k})^2}$$

where $L(\hat{I}, I)$ is a loss function of the reconstructed HR NTL image $\hat{I}$ and the to-be-compared HR NTL image I in the sample data set, $\hat{I}$ refers to the reconstructed HR NTL image, I refers to the to-be-compared HR NTL image in the sample data set; N refers to a number of samples in the sample data set; S refers to a number of scale layers of multi-scale loss, $L_1$ refers to L1 loss, $x_N$ refers to the LR NTL image data, $x_R$ refers to the road network data, $x_I$ refers to the impervious surface data; $\hat{I}(x_N, x_R, x_I)$ is refers to a reconstructed HR NTL image obtained by inputting the LR NTL image data $x_N$, the road network data $x_R$, and the impervious surface data $x_I$ on an s-th scale layer for an i-th sample; $I_{i,s}$ refers to the to-be-compared HR NTL image in the sample data set on an s-th scale layer for an i-th sample; and $L_{TV}$ refers to a TV regularization loss, and $\lambda$ refers to a weight hyperparameter of the TV regularization loss; $L_1(\hat{I},I)$ refers to L1 loss of the reconstructed HR NTL image $\hat{I}$ and the to-be-compared HR NTL image I in the sample data set, h refers to a row number of the reconstructed HR NTL image $\hat{I}$, w refers to a column number of the reconstructed HR NTL image $\hat{I}$, c refers to a channel number of the reconstructed HR NTL image $\hat{I}$, $\hat{I}_{i,j,k}$ refers to a reconstruction result of the HR NTL image of the i-th row and j-th column of a k-th channel, $I_{i,j,k}$ refers to the to-be-compared HR NTL image of the i-th row and j-th column of a k-th channel in the sample data set, $\varepsilon$ refers to $1e^{-3}$; $L_{TV}(\hat{I})$ refers to a TV regularization loss corresponding to the reconstructed HR NTL image $\hat{I}$, $\hat{I}_{i,j+1,k}$ refers to a reconstruction result of the HR NTL image of an i-th row and a (j+1)-th column of a k-th channel, and $\hat{I}_{i+1,j,k}$ refers to a reconstruction result of the HR NTL image of a (i+1)-th row and a j-th column of a k-th channel.

* * * * *